United States Patent [19]
Dahl

[11] Patent Number: 5,531,402
[45] Date of Patent: Jul. 2, 1996

[54] WIRELESS FLIGHT CONTROL SYSTEM

[76] Inventor: Robert M. Dahl, 108-A Castle Rock Rd., Walnut Creek, Calif. 94598-4515

[21] Appl. No.: 409,323

[22] Filed: Mar. 23, 1995

[51] Int. Cl.⁶ .................................................. B64C 13/24
[52] U.S. Cl. ........................................ 244/75 R; 244/189
[58] Field of Search ................................. 244/175, 75 R, 244/78, 221, 189, 228, 197, 227; 318/628, 696, 685, 564; 364/424.01

[56] References Cited

U.S. PATENT DOCUMENTS

| | | | |
|---|---|---|---|
| 3,146,972 | 9/1964 | Engel . | |
| 3,219,975 | 11/1965 | Finvold | 244/189 |
| 4,132,378 | 1/1979 | Stevens | 244/221 |
| 4,516,063 | 5/1985 | Kaye et al. | 244/223 |
| 4,759,515 | 7/1988 | Carl | 244/221 |
| 4,762,294 | 8/1988 | Carl | 244/75 R |
| 4,765,568 | 8/1988 | Carl et al. | 244/75 R |
| 4,793,137 | 12/1988 | Munk | 244/75 R |
| 4,793,576 | 12/1988 | Frerk | 244/228 |
| 4,876,906 | 10/1989 | Jones | 244/75 R |
| 4,965,879 | 10/1990 | Fischer, Jr. | 318/564 |
| 5,100,081 | 3/1992 | Thomas | 244/75 R |
| 5,330,131 | 7/1994 | Burcham et al. | 244/75 R |

OTHER PUBLICATIONS

Popular Science Magazine, Dec. 1993, pp. 22 and 72 Sun. Nov. 13, 1994, S.F. TV Station Kron, Ch. 4 Program "Next Step" re. Boeing 777.

*Primary Examiner*—Galen L. Barefoot

[57] ABSTRACT

A primary or backup flight control system for controlling the flight path of an aircraft or spacecraft using wireless transmitters (15 and 16) located near the flight deck (14) and positioned within, or on, the outer skin of the fuselage (10). These transmitters (15 and 16) send pilot-generated, wireless, e.g. infra-red, flight control signals (17 and 18) to receivers (19 and 21) located within, or on, the engines, wings, and tail assembly surfaces. These signals (17 and 18) are then directed to their respective engines or moveable flight control surfaces. These wireless control signals (17 and 18) are transmitted externally of the fuselage structure (10) and the transmission and receipt of these signals takes place on a single aircraft or spacecraft structure. In case of fuselage damage, e.g., due to structural failure, internal explosions, air-to-air collision, or military combat, which damages the primary flight control system (hydraulic, wire or cable), the present system will remain operative.

23 Claims, 4 Drawing Sheets

WIRELESS FLIGHT CONTROL SYSTEM

BACKGROUND

1. Field of Invention

This invention relates to aircraft, specifically to a novel flight control system for enabling the pilot to transmit flight control signals from the flight deck to the aircraft's directional control equipment, even in the event of a control system failure.

2. Description of Prior Art

In the early days of aviation, pilot-generated flight control forces for controlling the aircraft's flight direction were transmitted from a hand-operated joystick and rudder foot pedals. The joystick is a vertical rod gimballed at the bottom, so that the pilot could move its top in any direction. The joystick was connected to exterior flight control surfaces, through pulleys and cables, positioned inside the fuselage and wings. The cables went through the interior of the fuselage and wing structure to moveable control surfaces (flap type structures) located on the trailing edges of the wing and horizontal stabilizer (rear wing). These moveable control surfaces on the trailing edges of the wing are called ailerons, while moveable control surfaces on the trailing edges of the horizontal stabilizer (rear "wing") are called elevators.

E.g., when the pilot pushed the joystick to the right, it raised the trailing edge of the right aileron and the airstream pushed the right wing down. At the same time the right aileron was raised, lowering the right wing, the left aileron was lowered and the left wing was thereby raised. This caused the aircraft to roll to the right around the horizontal axis of the fuselage.

When the pilot pulled back on the joystick, cables located within the fuselage raised the trailing edge of the elevator control surface. The airstream pushed the tail down, causing the nose to rise around the transverse horizontal axis from wingtip to wingtip.

The pilot also used foot pedals that were connected by cables to a hinged moveable control surface located at the trailing edge of the vertical tail surface (rudder). When the pilot pushed the right foot pedal it moved the trailing edge of the rudder surface to the right, whereupon the airstream pushed the tail of the aircraft to the left, causing the nose to move to the right around the vertical axis of the aircraft.

These movements of flight control surfaces are the same today as they were in the early days of aviation.

To control the engine, the pilot used a throttle in the early days as well as today. The throttle was and still is connected to the engine by cables, rods and tubing.

At the present time, in many commercial and military aircraft, pilot-generated forces are transmitted through small tubes located within the fuselage. These tubes contain hydraulic fluid, under pressure, which is used to activate the external wing and tail flight control surfaces and engines.

Recently, a new technology has developed which uses transducers to convert pilot-generated mechanical forces to electronic signals. These electronic signals are then sent to a flight computer for modification. The computer produces digital control signals which are then transmitted, via internal wiring, located within the fuselage and wing structures, to the external moveable flight control surfaces. This is known as a "fly-by-wire" mode.

On a program titled "Next Step", on Sunday, Nov. 13, 1994 at 6:30 PM on San Francisco television Channel 4 (KRON), the construction of Boeing Aircraft's new model 777 aircraft was discussed and shown. One feature shown was the new primary "fly-by-wire" flight control system. The wiring is routed through the interior of the fuselage. A backup system, consisting of cables and pulleys, also routed through the interior of the fuselage structure, was provided for in case of failure of the primary system.

I.e., this aircraft manufacturer, and others, tried to solve the failure of a primary flight control system by installing a complete, secondary, backup system. The backup system was either a separate system using the same components, or a system using different components. However, nothing was done to protect these two internal control systems from structural damage that might occur due to accidents within the fuselage. Since all backup systems transmit pilot-generated forces to their respective destination flight control surfaces or engines via physical components in the inside of the aircraft, they are susceptible to failure due to structural damage, e.g., by an in-flight engine explosion, an air-to-air collision, terrorist bombs, and military combat. Such structural damage can sever any of these internal physical control systems, thus causing the pilot to lose control over these external flight control surfaces.

E.g., with the hydraulic system, a break in the hydraulic lines can cause a loss of hydraulic fluid, and thus a loss in operating pressure. This loss of operating pressure can also occur if an engine-driven hydraulic pump becomes inoperative due to an engine failure. With no hydraulic pressure, the pilot can no longer operate the external flight control surfaces and the airplane is out of control.

The following incidents were published in the National Transportation and Safety Board Reporter for the year 1989, Vol. 7, Numbers 7 and 9, dated July and Sept. 1989.

Apr. 15, 1988: A Horizon Air, Flight 2658, a DHC-8 aircraft had an engine fire and engine shut down on final approach. After landing, all flight controls, operated hydraulically, were inoperative, causing the aircraft to impact various ground objects. The NTSB concluded that the engine fire had caused "hydraulic line burn-through that in turn caused a total loss of airplane control."

Jul. 19, 1989: United Airlines Flight 232, a DC-10 widebody, three-engine jet aircraft sustained an engine failure in the center engine located internally in the vertical stabilizer area. Part of the engine exploded and engine fragments severed both the primary hydraulic flight control system and the backup auxiliary system and nearly all hydraulic fluid in the control systems was lost. The pilot of the aircraft had only slight control of the aircraft using differential power in the remaining two engines. The pilot was able to crash land the airplane at the Sioux City, Iowa airport, but in the process loss of life occurred.

Another accident occurred on Aug. 12, 1985 when a Japanese airliner, a Boeing 747, suffered a structural failure on a flight within Japan. The aircraft suffered an explosive decompression when the rear pressure bulkhead ruptured and knocked off part of the vertical stabilizer and rudder. This caused the loss of hydraulic fluid, which meant loss of use of all flight controls. For a lengthy period of time, the pilots were able to control the aircraft by varying the thrust of the engines, keeping the airplane in the air for sometime. Eventually they lost control of the aircraft; it crashed and of 524 persons on board 520 perished.

Another accident occurred on Sept. 22, 1981 when an Eastern Air Lines L-1011, a wide-body, three-engine aircraft, suffered an engine failure in its center engine, causing the loss of all hydraulic control systems.

The National Transportation and Safety Board has officially verified that loss of hydraulic pressure was the cause of all four of the preceding accidents.

There have been other aircraft accidents where the complete cause of the accident has not been determined. Pan American flight 103 departed London on Dec. 21, 1988 and was on course over Lockerbie Scotland when a terrorist bomb exploded. The bomb was the primary cause of the accident, but the airplane may have gone down because the flight control system was severed. We do know that other bombs have exploded on aircraft where damage was confined to certain non-critical areas and did not cause the loss of the airplane.

On Jun. 8, 1992 another unexplained accident occurred to a Boeing 737 of Compania Panama De Aviacion COPA Air Lines, a Panamanian airline. Their Flight 201 went down in the jungles of Panama near the Colombian border. The flight recorder was only able to tell the authorities that the aircraft suddenly banked to one side, then to the other side as it became inverted and went nose down into the ground. The official determination was that all flight control was lost for an unexplained reason.

At least one attempt has been proposed to solve this problem. U.S. Pat. No. 5,330,131, dated Jul. 19, 1994 to Frank Burcham et al., and the Dec. 1993 issue of Popular Science magazine, pages 22 and 72, disclose a backup flight control system using differential engine thrust on both sides of the aircraft. This was developed at NASA's Ames-Dryden Flight Research Facility, Edwards Air Force Base, Edwards, Calif. to provide a means of control in case an aircraft lost its flight control system. This new engines-only backup control system uses a multi-engine aircraft's engines for controlling its flight path by varying the thrust of each engine. The engines are controlled by electronic signals from the pilot. These signals are in turn modified by an electronic controller so as to change to the correct output power of the engines on each side of the aircraft. These electronic control signals are transmitted by wire through the internal structure of the aircraft. However, this solution does not solve the loss of control problems in those incidents where all engine power is lost on one side of the aircraft, or when the transmitting wires are severed inside the internal fuselage structure. This type of engine-only backup control system must rely on normal engine power on both sides of a multi-engine aircraft and is not operable if engine power is lost on one side of the aircraft. Further, this system is not feasible on a single engine aircraft.

OBJECTS AND ADVANTAGES

Accordingly, several objects and advantages of my present invention are:

(a) to provide an aircraft flight control system which will remain operable even when catastrophic structural damage has occurred to the flight control system components within the fuselage;

(b) to provide an aircraft flight control system that eliminates the need for cables, metallic and non-metallic wiring, fiberoptic cable, or tubing that connect the pilot's hand and foot controls with wing and tail located flight control surfaces and engines;

(c) to provide an aircraft flight control system where control signals transmitted from the pilot to moveable flight control surfaces and engines cannot be severed or damaged by physical means within the aircraft fuselage structure;

Other objects and advantages are to provide a wireless flight control system which cannot be destroyed within the fuselage, which can use conventional transducers to convert physical control forces from the pilot's hand and foot controls to wired electronic control signals, as used in present day "fly-by-wire" flight control systems, which can take wired flight control signals and using a transmitter, convert wired flight control signals to wireless control signals for external through the air, transmission, which can provide external, through the air, wireless control signal receivers within wing and tail flight control surface structures for the receiving of external through the air, wireless flight control signals, which can transmit and receive flight control signals using a plurality of media, which can easily provide dual system components, independent of each other, located in different areas of the aircraft resulting in even a greater safety factor, which can transmit and receive an external, through the air, wireless signal that is not dependent upon engine-generated electrical power, which can provide a battery-powered means of operating the necessary mechanical, hydraulic and electronic devices that move the control surfaces and engine controls, which can receive control signals transmitted from another aircraft, and which can receive control signals transmitted from a ground-based transmitter.

Further objects and advantages of my present invention are:

(a) to provide an aircraft flight control system that moves the transmission of flight control signals from within the fuselage to through the air, transmission of flight control signals on the exterior of the same aircraft;

(b) to provide an aircraft flight control system that can be automatically activated by placing sensor switches, designed to detect system failure, within the primary flight control system;

(c) to provide an aircraft flight control system where control signals from the pilot are conveyed, via conventional transducers and wiring, to wireless through the air transmitters located adjacent to the flight deck on the exterior of the fuselage;

(d) to provide an aircraft flight control system which uses the existing technology of telemetry to transmit the pilot's wireless flight control signals externally of the fuselage;

(e) to provide an aircraft flight control system where the pilot's control forces are transmitted by a wireless transmitter, externally of the fuselage, to receivers in the wings and tail assembly of the same aircraft;

(f) to provide an aircraft flight control system where the pilot's control forces can be transmitted to wings and tail by a plurality of wireless transmission methods, e.g. infra-red light, laser light, radio frequencies, radar, and other wireless means;

(g) to provide an aircraft flight control system where conventional receivers located in the wing and tail assemblies can receive flight control signals from the pilot, via conventional transmitters located adjacent to the flight deck, and can also receive signals transmitted from another aircraft;

(h) to provide an aircraft flight control system where external wing and tail receivers can also receive digitally encoded wireless control signals from the ground based, government operated, Air Traffic Control system;

(i) to provide an aircraft flight control system where flight deck, wings and tail assembly are self-contained flight control units with their own backup battery operated power supplies and control systems, and are not physically connected to each other;

(j) to provide an aircraft flight control system that causes no change to the pilot's use of normal hand and foot coordinated piloting skills, even though a primary flight control system has failed; and (k) to provide an aircraft flight control system that reduces serious accidents to a point where insurance carriers may lower insurance costs.

Still further objects and advantages will become apparent from a consideration of the ensuing description and drawings.

DRAWING FIGURES

Figure 3:
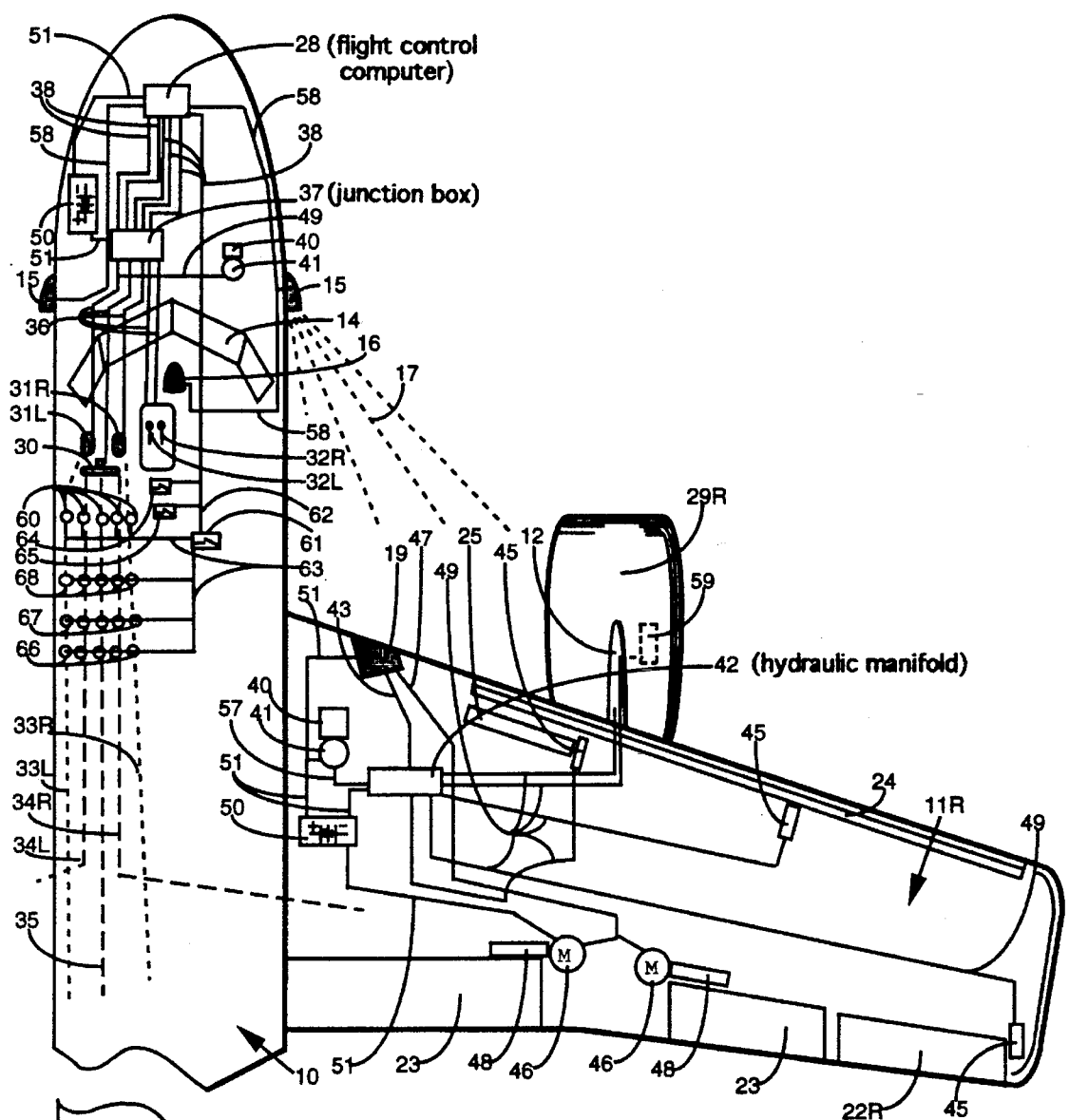

FIG. 3 displays a top view of the aircraft, showing internal details of the external wireless flight control system.

Figure 4:
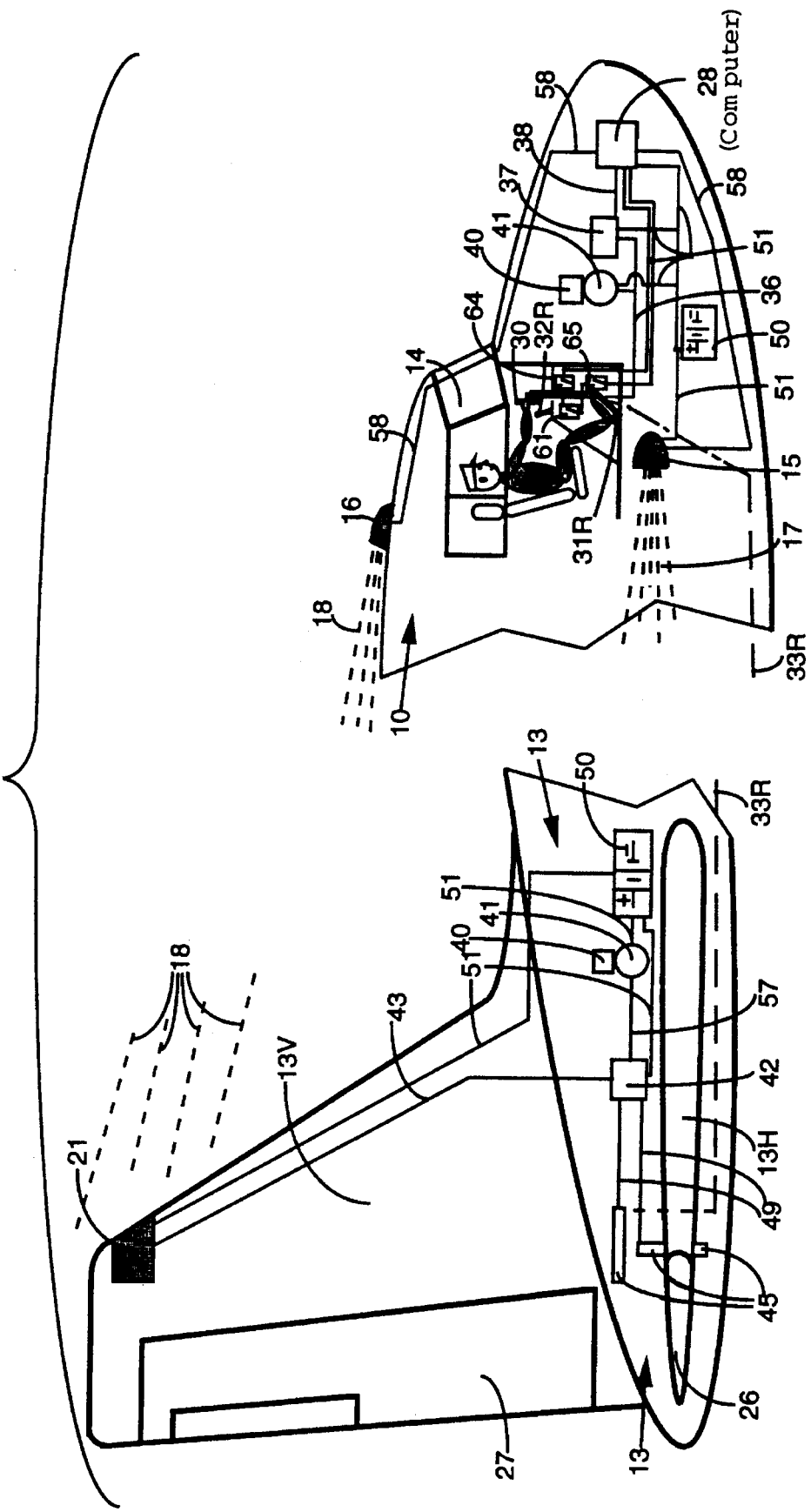

FIG. 4 shows a side view of the aircraft with a conventional flight deck and tail assembly, and also shows internal details of the external wireless flight control system.

REFERENCE NUMERALS IN DRAWINGS 10 fuselage
11R aircraft wing, right
11L aircraft wing, left
12 engine pylons
13 tail assembly
13H horizontal stabilizer of tail assembly
13V vertical stabilizer of tail assembly
14 flight deck area (cockpit)
15 wireless transmitters to wings and engines
16 wireless transmitter to tail assembly
17 visible wireless signals to engine and wing control surfaces
18 visible wireless signals to tail assembly control surfaces
19 wireless receivers for wing flight control surfaces
21 wireless receivers for tail assembly flight control surfaces
22R aileron flight control surface, right
22L aileron flight control surface, left
23 landing flap control surfaces
24 leading edge slot control surfaces
25 wing spoiler control surfaces
26 elevator control surface
27 rudder control surface
28 wireless system conventional flight control computer
29R engine, right
29L engine, left
30 pilot's control yoke (modified steering wheel)
31R pilot's rudder pedal, right
31L pilot's rudder pedal, left
32R engine throttle, right
32L engine throttle, left
33R conventional internal control system component, right rudder
33L conventional internal control system component, left rudder
34R conventional internal control system component, right aileron
34L conventional internal control system component, left aileron
35 conventional internal control system component, elevator
36 wireless system, hydraulic lines from pilot's controls
37 wireless system, conventional transducer junction box
38 wireless system, wiring from transducer to flight computer
40 wireless system, hydraulic reservoir
41 wireless system, hydraulic pump
42 wireless system, hydraulic valve manifold
43 wireless system, wiring from wireless receiver to valve manifold
45 wireless system, hydraulic actuating cylinder
46 wireless system, servo motor
47 wireless system, wiring from wireless receiver to servo motor
48 wireless system, worm gear drive to landing flaps
49 wireless system, hydraulic lines
50 wireless system, battery
51 wireless system, wiring to electronic components
57 wireless system, hydraulic line from pump to valve manifold
58 wireless system, wiring from flight computer to transmitter
59 wireless system, engine fuel metering device
60 wireless system, hydraulic pressure sensor
61 wireless system, emergency activation relay switch
62 wireless system, wiring from emergency switch to flight computer
63 wireless system, wiring from emergency sensor to emergency switch
64 wireless system, pilot operated main activation switch
65 wireless system, emergency shut-down relay switch, primary system
66 wireless system, continuity sensor, conventional primary system
67 wireless system, cable tension sensor, primary system
68 wireless system, magnetic cable connectors, primary system
70 ground based wireless transmitter
72 plane based wireless transmitter

SUMMARY

An improved flight control system transmits and receives its flight control signals by wireless transmissions e.g., infra-red or radio signals, external of the aircraft. If the aircraft suffers loss of control due to control system components being damaged within the fuselage, the wireless system can still be used to control the aircraft.

Description—FIGS. 1 to 4

Figure 1:
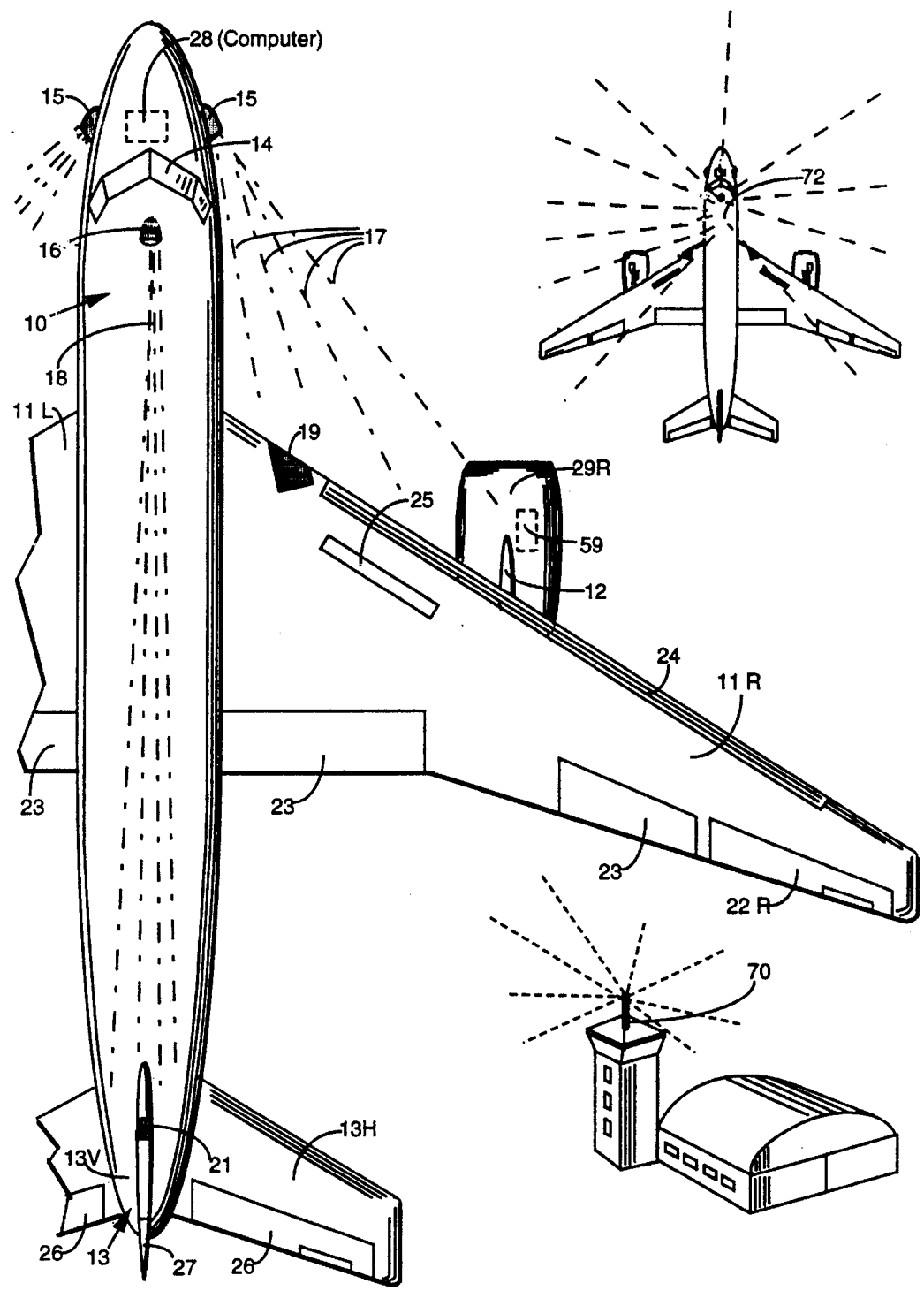
FIG. 1 is a top view of a large multi-engine aircraft, showing conventional external flight control surfaces and the preferred location of external wireless flight control transmitters and receivers in accordance with the invention.
Figure 2:
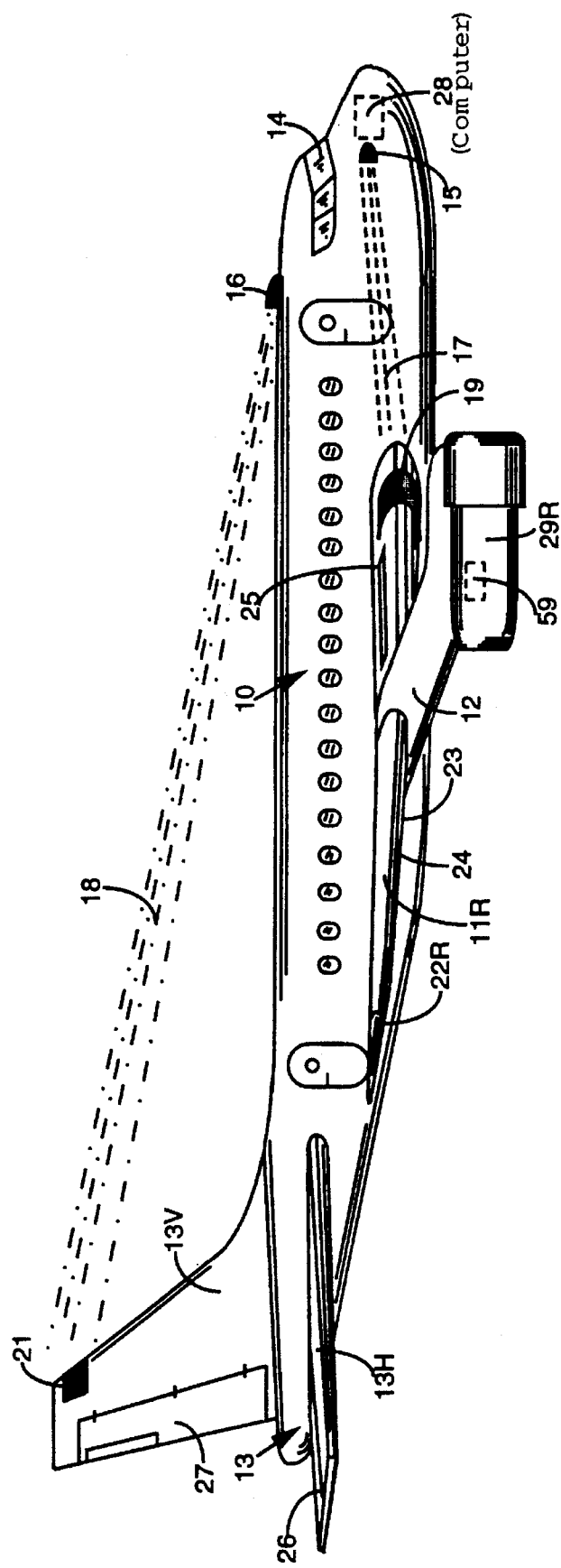
FIG. 2 shows a side view of the aircraft with conventional external flight control surfaces, and the preferred location of the external wireless flight control transmitters and receivers.

The aircraft in FIG. 1 is composed of the following conventional and well-known components: a fuselage 10, wings 11R and 11L, engines 29R and 29L, and tail assembly 13. Fuselage 10 is designed with flight deck 14 for housing the pilots. As shown in FIG. 3, flight deck 14 contains the pilot's control yoke 30 (a modified steering wheel), rudder pedals 31R and 31L, and engine throttles 32R and 32L, along with all other necessary controls (not shown) for operation of the aircraft.

When the pilot moves hand and foot controls 30, 31R, and 31L, small pistons in conventional master hydraulic cylinders (not shown), press against hydraulic fluid with a measurable force. This movement of the pistons causes a measurable hydraulic pressure to flow through small diameter hydraulic tubes 36, ending at transducer junction box 37. The conventional transducers in junction box 37 measure the various hydraulic pressures received from the pilot and convert these to equivalent electronic signals (not shown). These signals are sent on wires 38 from transducer junction box 37 to a conventional flight computer 28. Computer 28 receives these signals and processes them based on conventional parameters designed into the computer.

The signals emanating from computer 28, are transmitted by wires (not shown) through fuselage 10 to flight control surfaces on wings 11R and 11L and tail assembly 13. With this system, these wires (part of the presently used "fly-by-wire" system) are susceptible to fuselage damage from terrorist bombs, from in-flight engine explosions, from air-to-air collision, or possibly military combat.

These problems are obviated, in accordance with the invention. The present control system uses all of the previously described conventional components (except the wires) and adds the following components. Transmitters 15 and 16 are known per se but are used in a novel manner in the present system.

The pilot-generated flight control signals from computer 28 are conveyed by wires 58 to wireless transmitters 15 and 16. Preferably, transmitters 15 and 16 are infra-red (IR) transmitters which transmit wireless IR signals 17 and 18 to conventional wireless IR receivers 19 located within the leading edges of wings 11R and 11L and a conventional IR receiver 21 located within the leading edge of vertical stabilizer 13V in tail assembly 13. Flight control system IR transmitters 15 and 16 are located adjacent to flight deck 14 and are within, or on, the exterior skin of fuselage 10.

Conventional IR receivers 19 and 21 receive external flight control signals 17 and 18. Conventional wing receivers 19 receive wing-designated external flight control signals 17. These signals have specific values originated by the pilot and modified by conventional parameters within conventional flight computer 28. Receivers 19 then send flight control signals, with computer designated values, via wires 47 internally through wings 11R and 11L to landing flap servo motors 46. These conventional servo motors 46 operate conventional landing flap worm gear drives 48. Receivers 19 send pilot encoded flight control signals, with computer designated values, via wires 43 to conventional hydraulic valve manifold 42. Flight control signals, as modified by computer 28, open and close, by computer designated values, various valves in conventional valve manifold 42. Hydraulic fluid and pressure are provided by reservoir 40 and conventional hydraulic pump 41. Manifold 42 sends various control forces initiated by the pilot, through hydraulic lines 49 to conventional hydraulic cylinders 45 where the measured hydraulic force presses against the piston (not shown) within the hydraulic cylinders. The hydraulic cylinders 45 are located at each aileron 22R and 22L, each wing spoiler 25, each leading edge slot 24, and to each fuel metering device 59.

In case engine generated-power should fail, each wing 11R and 11L has an emergency battery 50. With emergency battery power available, each wing 11R and 11L, and all flight control components within the wings 11R and 11L, become self-contained units without any physical components routed through fuselage 10.

Receiver 21 in vertical stabilizer 13V of tail assembly 13 receives flight control signals 18 from transmitter 16. The flight control signals open and close, by computer designated values, various valves in manifold 42. Hydraulic fluid and pressure are provided by reservoir 40 and pump 41. Manifold 42 sends various control forces, initiated by the pilot, through hydraulic lines 49 to cylinders 45 located at each elevator 26 and at rudder 27.

Flight deck 14, wings 11R and 11L, and tail assembly 13 are self-contained control units with their own power supply batteries 50, hydraulic pumps 41, hydraulic reservoirs 40, and all peripheral equipment needed. Major damage within fuselage structure 10 can no longer sever flight control system components and no longer will aircraft be lost due to loss of flight control.

Operation—FIGS. 1 to 4

In case of an emergency in the primary flight control system, which severs the wires of the "fly-by-wire" system, the pilot may manually initiate the secondary wireless flight control system by activating conventional switch 64, which in turn closes emergency activation relay switch 61. Simultaneously, emergency relay switch 65 deactivates the conventional primary flight control system, eliminating any possible conflict in control signals.

The wireless system may also be automatically activated by conventional hydraulic pressure sensor 60 located within the conventional primary system. When the sensor registers an abnormal change in hydraulic pressure, (e.g., a drop in pressure below preset limits or an increase in pressure above preset limits) due possibly to fuselage structural failure severing hydraulic lines, or to pressure regulator failure, the sensor activates emergency relay switch 61. Switch 61 then energizes the complete wireless flight control system, while simultaneously, emergency relay switch 65 deactivates the primary flight control system. The changeover is automatic and requires no action by the pilot.

The pilot, using normal coordinated piloting skills, is then able to use the wireless flight control system in exactly the same manner as he or she uses the conventional primary flight control system.

For example, assume the conventional hydraulic system fails while departing from an airport. Also assume that the aircraft must climb and then turn to a designated departure course, e.g., a climbing right turn maneuver. Without the backup wireless system of the invention, all control would be lost and the plane would crash, causing loss of life and great property damage.

With the present system in place, the pilot operates the aircraft in a normal fashion. I.e., he or she eases control yoke 30 backward and presses it slightly clockwise. At the same time the right rudder pedal 31R is pressed inward slightly. Control yoke 30 and rudder pedal 31R, with the use of conventional master hydraulic cylinders (not shown), produce specific hydraulic pressure values in hydraulic lines 36.

These values are sent to conventional transducer junction box 37, via hydraulic lines The values are then converted to equal electronic values in junction box 37. These resultant electronic signals, with specific values from control yoke 30, and rudder pedal 31R, are sent from transducers 37 via wires 38 to computer 28. Computer 28 processes these signals and modifies them within conventional parameters designed into computer 28. Resultant signals, with their specific values, are sent by wires 58 to transmitters 15 and 16 located within, or on, the fuselage skin adjacent to flight deck 14. These signals are then converted, by transmitters 15 and 16, to wireless IR signals 17 and 18. Transmitters 15 and 16 send these signals externally via IR light to receivers 19 and 21. Receivers 19 and 21 convert the IR flight control signals to wired flight control signals with specific values. Which are then sent via wire 43 to hydraulic valve manifold 42.

These flight control movements from the pilot send computer-valued signals to valve manifold 42 which opens specific valves and sends measured hydraulic pressure to specific hydraulic cylinders 45. The measured hydraulic pressure then forces hydraulic fluid against a piston (not shown) in cylinder 45. The movement of the piston (not shown) in hydraulic cylinder 45 controls mechanical components that move flight control surfaces in wings 11R and 11L and tail assembly 13. In the climbing right turn, control yoke 30 is turned to the right raising right aileron 22R. Airstream pushes against the raised right aileron 22R, lowering right wing 11R. Simultaneously, left aileron 22L is lowered allowing airstream to push against the lowered left aileron 22L raising left wing 11L.

At the same time the pilot presses throttles 32R and 32L forward to increase power for the climb and right turn. This engine control signal from the pilot is transmitted through flight computer 28 where it is given a designated value and is then transmitted via wires 58 to transmitters 15. Transmitter 15 sends external wireless signal 17 to receiver 19 where it is converted to a wired engine control signal. It is then sent, via wire 43, to valve manifold 42 where a valve in manifold 42 opens and sends a computer modified engine control signal, via hydraulic lines 49, to fuel metering device 59 in engines 29R and 29L. This increases engine power for the climb and turn.

The climbing right turn signal from the pilot also sends external signal 18 to tail receiver 21 in vertical stabilizer 13V. Receiver 21 sends pilot-encoded signals via wire 43 to hydraulic valve manifold 42. These signals operate valves in hydraulic valve manifold 42, sending measured hydraulic pressure via line 49 to cylinder 45, raising elevator control surface 26. This causes the airstream to depress tail assembly 13 which raises the nose for a climb. The right turn signal sends hydraulic pressure to hydraulic cylinder 45 which moves rudder 27 to the right. The airstream pushes tail assembly 13 to the left, causing the nose to move to the right.

This completes the climbing right turn maneuver. No components of the wireless flight control system are located within fuselage structure 10 between flight deck 14 and tail assembly 13 so that any damage to the fuselage would not affect the aircraft's ability to fly. Thus the present system will save many lives and prevent property damage.

Retrofit of Cable-Controlled Aircraft

It is entirely feasible to add the present external wireless flight control system to aircraft with existing internal control systems, including a cable and pulley system. An upgrade kit will contain an emergency activation switch, emergency detection sensors, transducers, flight computer, IR transmitters and receivers, complete self-contained hydraulic systems, and will include all miscellaneous equipment i.e. wires, valves, tubing, cylinders etc. The upgrade kit will use both engine-generated power, and backup battery power.

Advantages

From the description above, a number of advantages of my external wireless flight control system become evident:

(a) With the external through the air, wireless flight control system in place, never again will an aircraft be lost because its internal flight control system was irreparably damaged by structural failure within the fuselage due to internal or external causes.

(b) The external wireless flight control system has self-contained battery-operated components and thus will continue to operate without the need for on-board, engine-generated electrical power.

(c) It is possible to install antennae that will receive digitized radio frequency signals on each wing and tail assembly. It then becomes possible for a ground-based transmitter, operated by an Air Traffic Control (ATC) system, to control an aircraft's direction and altitude for spacing within government controlled airways.

(d) With an external wireless flight control system in place, it is possible for an adjacent aircraft, with digitized IR transmission capabilities, to take control if for some reason the pilots or flight deck controls become incapacitated or inoperable.

Summary, Ramifications, and Scope

Additional embodiments are possible. The external, wireless control system may be used as a secondary emergency system by placing hydraulic pressure sensors 60 in conventional hydraulic lines 33R, 33L, 34R, 34L, and 35. When hydraulic pressure is found to be abnormal in the conventional hydraulic system, pressure sensor 60 will close emergency relay switch 61 which will activate the secondary wireless control system. Simultaneously, emergency shut-down relay switch 65 deactivates the conventional flight control system. In the case of a conventional fly-by-wire control system, a continuity sensor 66, senses a break in the circuit. The sensor closes emergency relay switch 61 which activates the secondary wireless control system. Simultaneously, emergency shut-down relay switch 65 deactivates the conventional primary flight control system eliminating any possible conflict in control signals. In the case of a primary system using cables and pulleys, cable tension sensor 67 senses a break in the cable. The sensor closes emergency relay switch 61 which will activate the secondary wireless control system. Simultaneously, emergency shut-down relay switch 65 de-energizes magnetic cable connectors 68 within each control cable, thus disabling conventional cable and pulley control system.

It is possible to transmit a wireless signal from flight deck 14 inside fuselage structure 10 to receivers (not shown) in the wing roots and tail assembly. From there, control signals are rerouted through wings 11R and 11L, and through tail assembly A remote, ground-based flight control transmitter, may also be provided so that ground personnel, e.g., at an airport control center, or personnel in another airplane, can operate the aircraft in case the structural damage occurs in the cockpit or the pilot is disabled. The ground-based control transmitter is indicated at 70 in FIG. 1 and the airplane-based transmitter is indicated at 72. Each of these remote transmitter sites includes a complete control system which is a duplicate of that on flight deck 14 of fuselage 10, but with additional transmitter power.

Accordingly, the reader will see that the present external wireless flight control system provides a highly reliable safety factor and backup system that greatly reduces the possibility of loss of aircraft, loss of life, or injury if structural failure should occur in present-day internally located flight control systems. Moreover it has the following additional advantages:

- It also provides continuing control despite the loss of hydraulic fluid to a primary internal flight control system, as long as the aircraft is equipped a secondary external wireless flight control system.
- It provides continuing control despite the loss of onboard engine-generated electrical power, as long as the aircraft is equipped with a secondary, external, battery-powered, wireless control system.
- It allows the pilot to use familiar skills, with normal coordination of hands and feet to control the aircraft, even though all internal control cables, hydraulic lines, and other internal physical control systems have been severed.
- It permits an aircraft control system where the flight control receivers may receive wireless control signals from ground based transmitters; and
- It provides an aircraft control system that greatly reduces serious accidents to the point where insurance carriers will be obliged to reduce insurance premiums.

Although the description above contains many specificities, these should not be construed as limiting the scope of the invention but as merely providing illustrations of some of the presently preferred embodiments of this invention.

For example, the operator, also known as pilot, driver, or helmsman, may actuate external wireless control signals that may be used to send actuating signals to the landing gear system. It is possible to use external, wireless telemetric signals to actuate flight control surfaces, and flight control thrust nozzles on spacecraft. Rockets designed for use in space travel can use external, wireless signals transmitted down their outside as a back-up system to their primary internal control system. The wireless back-up system will not be severed if an accidental explosion should occur internally in the rocket. In military formation flights it is possible for the flight leader's aircraft to transmit wireless control signals to other aircraft in the formation. The flight leader can therefore control some functions of the other aircraft in the formation, e.g. simultaneously dropping all bombs of the aircraft in the formation.

It is feasible for large petroleum carrying supertankers to transmit wireless telemetric control signals from the bridge to the stern rudder area and to other hull directional control systems. These wireless signals will negate explosive or collision damage to its primary internal control system. Naval aircraft carriers, and other naval ships, can use the system to transmit external, wireless telemetric control signals from the bridge to receivers in the stern rudder area and to other receivers for controlling hull directional equipment. This will ensure control of vessels even if bombs or torpedoes sever the primary internally located physical control system. External, wireless control systems may also be used for controlling other on-board combat equipment. It is feasible that combat damaged aircraft may be brought aboard an aircraft carrier by ship-based digital transmissions, if aircraft are equipped with external, wireless flight control systems.

Large truck and trailer rigs can use the system to send external telemetric signals to actuate self-contained air pressure braking systems. The air pressure hoses and wiring between the tractor and the trailer can thus be eliminated. The external, telemetric signals can be used on railroad trains to actuate simultaneous braking in all of the self-contained compressed air braking systems on each freight car. It will not be necessary to physically connect air pressure hoses between each freight car.

The present wireless flight control system may be either a primary system or a system secondary to today's state of the art system. It is also possible that both primary and secondary systems can be external, wireless flight control systems. With a dual external wireless system in place, many system components would be at least doubled, or in some cases, tripled. This would not only increase the safety factor, it would also free more revenue generating, internal fuselage space.

Thus the scope of the invention should be determined by the appended claims and their legal equivalents, rather than by the examples given.

I claim:

1. An external wireless travel direction controller system for an enclosed vehicle having an internal direction controller system within said vehicle, comprising:

(a) at least one operator-controllable means for enabling an operator of said vehicle to make at least one adjustment for controlling said vehicle's travel direction, (b) a wireless transmitter means mounted continuous with the external surface of said vehicle for converting operator-made adjustments of said operator controllable means into a signal containing encoded information indicative of said operator made adjustments, and transmitting said signal in a wireless, through-the-air mode, external to said vehicle (c) a receiver means, located at an exterior surface of said vehicle and remote from said wireless transmitter means, for receiving said wireless signal on said vehicle and converting said signal to a wire-carried signal for controlling said at least one travel direction adjustment, (d) an adjustment means for adjusting a travel-direction controlling means in response to said wire-carried signal, and (e) a switching means for switching between said internal travel direction controller system and said external wireless controller system, whereby directional control is maintained when an interruption of the internal controller system structure and/or function occurs.

2. The system of claim 1 in which said switching means includes a conventional switch for manual activation by said operator for said external travel direction controller system.

3. The system of claim 1, further including a hydraulic control system forming part of said internal direction controller system having a plurality of hydraulic pressure sensor switches.

4. The system of claim 3, further including a plurality of hydraulic pressure sensor switches for sensing changes in hydraulic pressure in said hydraulic control system that exceeds a predetermined preset limit and thereupon automatically activate said external travel direction controller system.

5. The system of claim 1 wherein said switching means includes a cable tension sensor switch means for activating said external travel direction controller system.

6. The system of claim 5 wherein said cable tension sensor switch is arranged to detect a break in a control cable and activate said external travel direction controller system.

7. The system of claim 1 wherein said switching means includes a continuity sensing switch for activating said external travel direction controller system.

8. The system of claim 7 wherein said vehicle is an airplane with a fly-by-wire control system and said continuity sensing switch is arranged to detect a break in a wire in said fly-by-wire control system and to activate said external travel direction controller system.

9. The system of claim 1 wherein said operator-controllable means comprises a means for converting operator generated hydraulic control pressure values to equivalent electronic signal values.

10. The system of claim 1 wherein said operator-controllable means comprises a flight computer means for modifying a pilot generated electronic control signal value to fit within a predetermined control signal value for use by a computer.

11. The system of claim 1 wherein said transmitter means and said receiver means transmits and receives a plurality of infra-red signals.

12. The system of claim 1 wherein said external direction controller system comprises an electronically controlled mechanical valve device means for metering an equivalent hydraulic control pressure value output in response to an equivalent electronic signal.

13. The system of claim 12 wherein said external direction controller system comprises a hydraulic cylinder means for converting said equivalent hydraulic control pressure value into an equivalent mechanical movement of said adjusting travel-direction controlling means.

14. The system of claim 1 wherein said vehicle is an aircraft and said travel-direction controlling means comprise a plurality of adjustable control surfaces on the exterior of said aircraft.

15. The system of claim 1 wherein said travel direction controlling means is an aircraft rudder, an aircraft elevator, a plurality of aircraft ailerons, an aircraft engine, and a plurality of wing and tail mounted adjustable control surfaces.

16. The system of claim 1 wherein said vehicle is an airplane comprising a flight deck, a plurality of wing structures, an engine, a tail assembly, and a control system with means providing a backup battery operated power supply for all electronically operated components within said flight deck, wing structures, engines, and tail assembly.

17. In an aircraft which has an aircraft structure and a plurality of moveable control surfaces for effecting pitch, roll, and yaw moments, and which has an internal flight control system including a plurality of hydraulic pressure sensor means, an external wireless flight control system comprising:

(a) a means continuous with the exterior surface of said aircraft structure for initiating and transmitting a plurality of through-the-air flight control signals external to the aircraft in response to an activation from one of said plurality of hydraulic pressure sensor means exceeding a predetermined limit, in a wireless, through-the-air mode, and (b) a means located near said plurality of moveable control surfaces for receiving said plurality of said through-the-air flight control signals and including means for moving said moveable control surfaces in response to said plurality of flight control signals when in said external wireless flight control system configuration.

18. The system of claim 17 wherein said plurality of hydraulic pressure sensor means are arranged to activate a plurality of relay switches including a main relay switch in said external wireless flight control system.

19. The system of claim 18 wherein said plurality of hydraulic pressure sensor means are arranged to detect hydraulic pressure in said system exceeding a predetermined value and deactivate said internal flight control system while activating said main relay switch in said external wireless flight control system.

20. The system of claim 17, further including a plurality of continuity sensors and a fly-by-wire circuit in said internal control system, said internal control system including a main relay switch for automatically initiating said external wireless flight control system, said continuity sensors being arranged to detect a break in said fly-by-wire circuit and thereby activate said main relay switch.

21. The system of claim 20 wherein said continuity sensors are arranged to detect a circuit break in said fly-by-wire control system and deactivate said fly-by-wire internal control system while activating said main relay switch in said external wireless flight control system.

22. The system of claim 17, further including a plurality of cable tension sensors and a cable and pulley system containing said cable tension sensors, said sensors being arranged to activate a main relay switch in said external wireless control system in response to a predetermined change in cable tension.

23. The system of claim 22 wherein said cable tension sensors are arranged to detect a break in said cable and pulley control system and deactivate said system while activating said main relay switch in said external wireless flight control system.

* * * * *

UNITED STATES PATENT AND TRADEMARK OFFICE
CERTIFICATE OF CORRECTION

PATENT NO. : 5,531,402

DATED : July 2, 1996

INVENTOR(S) : Robert M. Dahl

It is certified that error appears in the above-indentified patent and that said Letters Patent is hereby corrected as shown below:

Col. 12, line 30, change "continuous" to —contiguous—

Col. 14, line 3, change "continuous" to —contiguous—

Signed and Sealed this

First Day of October, 1996

Attest:

BRUCE LEHMAN

Attesting Officer — Commissioner of Patents and Trademarks